United States Patent [19]

Parke et al.

[11] Patent Number: 4,632,841
[45] Date of Patent: Dec. 30, 1986

[54] LOW FAT SPREADS CONTAINING EMULSION DISRUPTORS

[75] Inventors: Daniel W. Parke, Henrietta, N.Y.; Kenneth S. Baker, Tenafly, N.J.

[73] Assignee: Lever Brothers Company, New York, N.Y.

[21] Appl. No.: 804,213

[22] Filed: Dec. 3, 1985

Related U.S. Application Data

[63] Continuation-in-part of Ser. No. 619,749, Jun. 11, 1984, abandoned.

[51] Int. Cl.$^4$ .......................... A23D 3/00; A23D 3/02
[52] U.S. Cl. ..................................... 426/604; 426/607
[58] Field of Search ........................ 426/602, 603, 604

[56] References Cited

U.S. PATENT DOCUMENTS

| | | |
|---|---|---|
| 3,407,071 | 10/1968 | Bookwalter et al. . |
| 3,782,970 | 1/1974 | Tomita et al. . |
| 3,914,458 | 10/1975 | Terada et al. . |
| 3,939,290 | 2/1976 | Terada et al. .................. 426/602 X |
| 3,946,122 | 3/1976 | Scharp . |
| 4,279,941 | 7/1981 | Bosco et al. . |
| 4,389,426 | 6/1983 | Reissmann et al. ................. 426/602 |
| 4,396,638 | 8/1983 | Edo et al. . |
| 4,404,231 | 9/1983 | den Hollander et al. .......... 426/602 |
| 4,414,229 | 11/1983 | Bakal et al. . |
| 4,446,165 | 5/1984 | Roberts . |

FOREIGN PATENT DOCUMENTS

| | | |
|---|---|---|
| 378373 | 7/1932 | United Kingdom . |
| 1200921 | 8/1970 | United Kingdom . |
| 1444025 | 7/1976 | United Kingdom . |
| 1564801 | 4/1980 | United Kingdom . |

OTHER PUBLICATIONS

Lissant, K. J., "Emulsions and Emulsion Technology", Marcek Dekker, Inc., New York, 1974, pp. 264–267.
"Emulsions" by W. C. Griffin, Kirk–Othmer Encyclopedia of Chemical Technology (Third Edition), vol. 8, pp. 901–930.

*Primary Examiner*—Robert Yoncoskie
*Attorney, Agent, or Firm*—Milton L. Honig; James J. Farrell

[57] ABSTRACT

An edible water-in-oil emulsion useful as a low fat spread is provided which contains from about 10 to 900 ppm of an anionic or from about 10 to 75 ppm of a nonionic emulsion disruptor, the disruptors having an HLB from 9 to 20. Reduced salt levels, without adverse taste effects, are achieved by use of the emulsion disruptor. Alternatively, in the absence of salt level reductions, addition of an emulsion disruptor provides enhanced flavor perception to spreads.

24 Claims, No Drawings

1

LOW FAT SPREADS CONTAINING EMULSION DISRUPTORS

BACKGROUND OF THE INVENTION

This application is a continuation-in-part of application Ser. No. 619,749, filed June 11, 1984, now abandoned.

1. Field of the Invention

The invention relates to edible water-in-oil emulsions, especially, low fat spreads and a process for their preparation.

2. The Prior Art

Most spreads contain salt. Flavor perception is enhanced by salt. The amount of salt and its speed of release are important determinants of product taste.

In recent years, low fat spreads have become popular with diet conscious consumers. These same consumers are not only concerned with their calorie and cholesterol intake, they also wish to limit their salt consumption. Unfortunately, low fat spreads require higher salt levels to achieve a taste equivalent to full fat products.

Generally, full fat margarines do not encounter a flavor perception problem. Their oil phase encases the water droplets in a fat crystal matrix. Until this matrix melts, the water droplet containing salt is stable. Upon melting in the mouth, salt is quickly liberated. In contrast, water-in-oil emulsions containing less than 80% fat, i.e. low fat spreads, do not readily release salt upon melting. The large amount of internal aqueous phase is encased by a smaller amount of crystalized fat in low fat spreads. Under this configuration, the speed at which the emulsion breaks becomes the controlling factor in salt release.

Low-fat spreads have been described in U.S. Pat. No. 4,279,941 by Bosco et al. Therein are disclosed emulsions which have a smooth and creamy taste while melting quickly in the mouth to release flavor without imparting a "waxy" mouthfeel. The continuous aqueous phase contains an emulsion stabilizer system comprising both lipophilic and hydrophilic emulsifiers in an amount from 0.3 to 4.0%. Each of the lipophilic and hydrophilic moieties are present at levels of at least 0.05%. Although Bosco et al achieve a product of good emulsion stability and taste, there is no indication that quick salt release is achieved. Furthermore, the patent is directed at oil-in-water, rather than water-in-oil emulsions.

U.S. Pat. No. 4,115,598 (Moran) reports solving the problem of insufficient flavor-release encountered in low fat spreads prepared from a defined fat. The patent proposes incorporation of an emulsion destabilizer operative at palate conditions. These destabilizers were said to be effective within the range of about 0.1 to 0.8% by weight, although amounts as low as 0.01% were said to be sufficient for Tween ® type destabilizers. A very specific fat phase, reflective of stick-type low fat spread compositions, was therein defined as follows: a solids content of 10-35% at all temperatures from 10° to 20° C.; a difference in solids content at 10° and 20° C. of no more than 10%; and a solids content at 30° C. of less than 5%. The patent does not, however, indicate whether the disclosed destabilizers are operative for soft-type low fat spreads.

Accordingly, it is an object of the present invention to provide an edible low fat water-in-oil spread of the soft variety that imparts an enhanced flavor.

Another object of this invention is to provide an edible low fat soft spread of reduced salt content without adversely altering taste.

A further object of this invention is to provide a method for reducing the salt content of a low fat soft spread without adversely altering taste.

Still another object of this invention is to provide a process for producing a reduced salt, low fat soft spread.

SUMMARY OF THE INVENTION

An edible water-in-oil emulsion, solid at refrigerator temperatures, is provided comprising:

(i) from about 30 up to 80% oil as the continuous phase, wherein said oil has:
  (a) a solids content of 14 maximum at 10° C.,
  (b) a solids content of 6.0 to 8.5 at 21.1° C., and
  (c) a solids content of 0.7 to 2.8 at 33.3° C.;
(ii) from about 70 to 20% water as the dispersed phase; and
(iii) from about 10 to 75 parts per million, by weight of the total emulsion, of a nonionic emulsion disruptor with an HLB from 9 to 20.

Furthermore, a method for reducing the salt content of an edible water-in-oil emulsion, solid at refrigerator temperatures, is provided which does not adversely affect flavor comprising combining from about 10 to 75 parts per million, by weight of the emulsion, of a nonionic emulsion disruptor having an HLB from 9 to 20 with:

(i) from about 30 up to 80% oil as the dispersed phase, wherein said oil has:
  (a) a solids content of 14 maximum at 10° C.,
  (b) a solids content of 6.0 to 8.5 at 21.1° C., and
  (c) a solids content of 0.7 to 2.8 at 33.3° C.; and
(ii) from about 70 to 20% water as the continuous phase.

DETAILED DESCRIPTION OF THE INVENTION

Milk proteins such as whey and caseinates have been used for some time by the margarine industry as salt release aids. These proteins, however, are only suitable for higher fat content spreads. The flavor release aids of Moran in U.S. Pat. No. 4,115,598 are reported as applicable to low fat spreads of the hard stick variety.

Now, it has been found that certain compounds when added to such water-in-oil emulsions as soft-type low fat spreads increase the salt release rate of the final product during melting in the mouth. These compounds accomplish their taste effect by disrupting emulsion stability in the mouth. Accordingly, we designate these compounds as emulsion disruptors. Only trace amounts of these compounds need be present. Anywhere from about 10 to 75 parts per million, based on the total emulsion weight may be sufficient to realize the effect. Operative concentrations within the broad range will, however, vary depending upon the particular emulsion disruptor, its HLB value and the specific emulsion. Lower concentration limits will depend upon flavor enhancement imparted by each particular emulsion disruptor. Disruptor levels above a critical concentration will cause processing problems such as emulsion breakage during votation. Beyond the herein defined concentration levels, disruptors will also destabilize the finished emulsion to such an extent that it will invert.

Emulsion disruptors are characterized by an HLB value of from 9 to 20. HLB, the hydrophile-lipophile balance, is an expression of the relative simultaneous attraction of an organic compound for water and for oil. HLB values may be calculated from either theoretical composition or analytical data, although the latter provides considerably greater accuracy. An article by W. C. Griffin entitled "Emulsions", Kirk-Othmer Encyclopedia of Chemical Technology (Third Edition), Vol. 8, discusses calculation and tabulates typical HLB values of many emulsion disruptors useful for the instant invention. Griffin's article is herein incorporated by reference.

Where salt levels are already satisfactory, low fat spreads may incorporate emulsion disruptors to improve taste. Alternatively, where a salt reduction is required, emulsion disruptors can maintain the level of taste sensation while using a lower total salt content.

High HLB emulsion disruptors specified in this invention are distinguished from low HLB emulsifiers normally used in low fat spread compositions as emulsion stabilizers. The latter may be present in formulations of the instant invention but have no effect upon enhancing salt perception.

A wide variety of emulsion disruptors may be employed. These include food grade nonionic and anionic compounds of HLB 9–20. Among the nonionic type within the present invention are:

(i) polyoxyethylene derivatives of sorbitan and of sorbitan mono-, di-, and tri-fatty acid esters wherein the fatty acid component has between 12 and 24 carbon atoms. The preferred polyoxyethylene derivatives are of sorbitan, sorbitan monolaurate, sorbitan trilaurate, sorbitan monopalmitate, sorbitan tripalmitate, sorbitan monostearate, sorbitan monoisostearate, sorbitan tristearate, sorbitan monooleate and sorbitan trioleate. The polyoxyethylene chains may contain between about 4 and 30 ethylene oxide units, preferably about 20. Sorbitan ester derivatives contain 1, 2 or 3 polyoxyethylene chains depending upon the extent of fatty ester substitution.

Especially preferred commercial embodiments are Polyoxyethylene 20 Sorbitan Trioleate, Polyoxyethylene 5 Sorbitan Monooleate, Polyoxyethylene 20 Sorbitan Monooleate, Polyoxyethylene 20 Sorbitan Tristearate, Polyoxyethylene 20 Sorbitan Monostearate, Polyoxyethylene 20 Sorbitan Monopalmitate and Polyoxyethylene 20 Sorbitan Monolaurate. These compounds are available from ICI Americas, Inc., under the trademarks "Tween 85" (HLB 11.0), "Tween 81" (HLB 10.0), "Tween 80" (HLB 15.0), "Tween 65" (HLB 10.5), "Tween 60" (HLB 14.9), "Tween 40" (HLB 15.6) and "Tween 20" (HLB 16.7), respectively. Particularly preferred is sorbitan monooleate ethoxylated with 20 moles ethylene oxide, known commercially as Tween 80.

(ii) polyoxyethylene derivatives of fatty alcohols wherein the fatty alcohol component has between 12 and 24 carbon atoms. The polyoxyethylene chains may contain between about 4 and 30 ethylene oxide units, preferably about 20. Exemplative of compounds within this group are the polyoxyethylene derivatives of tridecyl alcohol.

(iii) polyoxyethylene derivatives of fatty acids wherein the fatty acid component has between 12 and 24 carbon atoms. The polyoxyethylene chains may contain between about 4 and 50 ethylene oxide units, preferably about 40. Exemplative of this category are Polyoxyethylene 10 Oleyl Ether (HLB 12.4), Polyoxyethylene 20 Oleyl Ether (HLB 15.3), Polyoxyethylene 20 Stearyl Ether (HLB 15.3), Polyoxyethylene 8 Stearate (HLB 11.0) and Polyoxyethylene 40 Stearate (HLB 16.9). These compounds are available commercially from ICI Americas, Inc.

(iv) polyoxyethylene derivatives of glycerol mono-, di-, and tri-fatty acids wherein the fatty acid component has between 12 and 24 carbon atoms. The polyoxyethylene chains may contain between about 4 and 40 ethylene oxide units. Particularly preferred are polyoxyethylene glycerol monoisostearate, polyoxyethylene glycerol monolaurate, polyoxyethylene glycerol monooleate, polyoxyethylene glycerol monopalmitate and polyoxyethylene glycerol monostearate.

Additionally, polyoxyethylene glycerol and various other ethoxylated mono- and di-fatty glycerides may be utilized where the HLB is between 9 and 20.

The preferred concentration range for nonionic emulsion disruptors is from about 10 to 75 parts per million by weight of total emulsion. Particularly preferred is a range from about 25 to 75 parts per million. Higher levels will cause emulsion breakage during votation and at very high levels emulsion inversion will result.

Anionic compounds within the stated HLB range may also be utilized as emulsion disruptors. While many such anionic compounds are commercially available, only a select few are certified for use in foodstuffs. Illustrative of this category is sodium lauryl sulfate (HLB 9.5). Sodium and potassium oleates are further preferred examples. Although sodium is present in many anionic emulsion disruptors, very little is thereby added to the total sodium content of the food since disruptor amounts are only at parts per million. Indeed, these anionics, similar to the nonionic compounds, impart a salt sensation far beyond the effect of sodium chloride.

The preferred concentration range for anionic emulsion disruptors is from about 10 to 600 parts per million by weight of total emulsion. Particularly preferred is a range from about 25 to 400 parts per million.

Oils intended for use as the continuous phase include all edible fatty acid triglycerides regardless of origin. However, these fats must possess specified Solid Fat Index values in order that soft-type low fat spreads may be produced therewith. The Solid Fat Index profile is as follows: a solids content of 14.0 maximum at 50° F. (10° C.); a solids content of 6.0 to 8.5 at 70° F. (21.1° C.); and a solids content of 0.7 to 2.8 at 92° F. (33.3° C.). Typical suitable vegetable oils are those of soybean, corn, cottonseed and sunflower oils. Usually, these oils will be partially or completely hydrogenated. Particularly preferred is soybean and cottonseed oil, and mixtures thereof.

Oil content will range from about 30 up to 80% by weight of the total emulsion. Preferably, the oil will range from about 35 to 60%.

In the compositions of this invention, conventional low fat spread additives may be incorporated including stabilizing emulsifiers, flavorants, salt, colorants, preservatives, vitamins, antioxidants and other functional ingredients.

Among the suitable flavorants are diacetyl, butyric acid, ethyl butyrate and related ketones, acids and esters. Butter flavors are imparted by these materials. However, flavors other than butter may also be formulated.

Emulsifying agents are usually added to obtain a stable emulsion. These emulsifiers will generally have an HLB value between 0 and 8. Illustrative of this category are sorbitan mono-fatty acids such as sorbitan-monostearate, -monooleate, -monopalmitate and -monolaurate. Glyceryl mono- and di-fatty acids are also suitable. For example, there may be utilized glyceryl-dioleate, -dipalmitate, -distearate and -monooleate. Lecithin may also be employed. Frequently, combinations of the above or related emulsifiers will be found most effective for stabilizing the emulsions. Particularly preferred is a combination of lecithin with the mono and diglycerides.

Stabilizing emulsifiers as aforementioned, may be present from about 0.1 to 5% by weight of the total emulsion.

Coloring agents such as carotene and annatto may be included to provide the appropriate yellow color.

Preservatives may be incorporated including benzoic acid, sorbic acid and the corresponding salts of the foregoing acids.

Vitamins are usually incorporated into the low fat margarines. These include vitamins A and D.

Antioxidants that may be included are butylated hydroxyanisole (BHA), butylated hydroxytoluene (BHT), EDTA, fatty citrates and various gallates and tocopherols.

In the aqueous phase are usually placed those functional additives soluble in water. Accordingly, salt (sodium chloride) is generally present therein in an amount from about 0.1 to 5% by weight of the total emulsion.

Other recommended ingredients which may be included are edible proteins such as liquid, condensed or dry whey; whey modified by the reduction of lactose and/or minerals; nonlactose containing whey components; albumin; casein; casinate; vegetable proteins; and soy protein isolate. These are usually present from about 0.01 to 5% by weight of the total emulsion.

The following examples will more fully illustrate the embodiments of this invention. All parts, percentages and proportions referred to herein and in the appended claims are by weight of the total emulsion unless otherwise stated.

EXAMPLE 1

Illustrative of a soft low fat spread emulsion according to the present invention is the formulation listed in Table I.

TABLE I

| Ingredient Composition | Soft Product |
| --- | --- |
| (Oil Phase, wt. %) | (40%) |
| Partially Hardened Soybean Oil | 39.4 |
| Mono and Diglycerides (minimum 40% mono) | — |
| Monoglycerides (minimum 90% mono) | 0.34 |
| Lecithin | 0.20 |
| Color/Vitamins | 0.0066 |
| Flavor | 0.0090 |
| (Water Phase, wt. %) | (60%) |
| Water | 57.3 |
| Salt | 2.5 |
| Sweet Whey | — |
| Potassium Sorbate | 0.10 |
| Lactic Acid | 0.02 |
| EDTA | 0.0075 |
| Tween 80* | 0.0025 |

*Added subsequent to water-in-oil emulsion formation.

The soft product outlined in Table I was prepared according to the following process. Melted lecithin and mono and diglycerides were added to partially hardened soybean oil kept at 125° F. Vitamins and color were then added to the mixture. An aqueous phase was separately prepared from salt, potassium sorbate, lactic acid and EDTA dissolved in water. The aqueous phase was then added to the oil phase with continuous mixing. Flavorant was then incorporated into the resultant blend. Thereafter, the churn temperature was adjusted to 90°-100° F. After about 5-10 minutes of churning at stable temperature, Tween 80 was added. Mixing was continued for an additional five minutes. The process was completed by pumping the emulsion through a series of multiple scraped surface heat exchangers, each known as a Votator TM, Girdler Corp. The Votator TM equipment cooled and crystallized product. Subsequently, the material was subjected to "C unit" processing for softening and further blending. Crystallization—softening—blending steps were repeated by passage through a second set of Votator TM and "C units". Finally, the emulsion was packed into tubs at a final product temperature of 50°-60° F.

EXAMPLE 2

Organoleptic properties for compositions of the instant invention are illustrated in this Example. Thirty experienced tasters were assembled for a taste panel. A series of spread samples were prepared according to Table III, except for herein stated variations in Tween 80 and salt levels. These samples were evaluated, on a blind basis, by each of the panelists. A pat of each sample was spread on a cracker for tasting. Between samples, panelists rinsed their mouth with water. Taste preference and saltiness evaluations are presented in Table II. Samples 2 through 4 were prepared by the preferred 'process wherein the emulsion disruptor, Tween 80, was supplied to the spread only at completion of the emulsion formation. Samples 5-7 were prepared with Tween 80 incorporated into the oil phase prior to emulsion formation with the aqueous phase. Number pairs under the taste preference and saltiness headings of Table II refer to the number of panelists preferring a particular sample over the control.

Panelists showed an overall taste preference for sample 2 containing 25 ppm Tween 80 over control sample 1 having no emulsion disruptor. Samples 2 and 3 with Tween 80 were perceived by more panelists to impart a saltier taste than the control having an identical salt level but without emulsion disruptor. Sample 4 with 20% less salt was taste preferred and similar in saltiness to control sample 1.

Samples 5 and 6, prepared by the method of incorporating Tween 80 into the oil phase prior to emulsion formation, were overall taste preferred relative to the control. Saltiness, however, was judged inferior to that of the control. These taste tests were done within one week of the spread preparation. Upon further storage for a total of one month past preparation, the saltiness ratings with samples 5-7 changed. Samples 5-7 were now judged as not significantly different in overall taste and at least as salty as the control. With samples 2 through 4, taste preference or saltiness rating order remained unchanged whether sampled at one week, four weeks or after prolonged storage. However, the majority of panelists noted a slight increase in salt intensity for samples 2-4 upon storage.

TABLE II

Taste Performance Panel Testing

| Sample | Tween 80 (ppm) | Salt (%) | Overall Taste Preferance vs. Control* | Saltiness vs. Control* |
|---|---|---|---|---|
| A. Tween 80 Added to Pre-formed Emulsion | | | | |
| 1 | 0 | 2.5 | Control | Control |
| 2 | 25 | 2.5 | 18:11 | 22:6 |
| 3 | 50 | 2.5 | 14:16 | 24:4 |
| 4 | 50 | 2.0 | 16:12 | 14:13 |
| B. Tween 80 Added to Oil Phase Prior to Emulsion | | | | |
| 1 | 0 | 2.5 | Control | Control |
| 5 | 25 | 2.5 | 21:9 | 8:22 |
| 6 | 25 | 2.25 | 17:13 | 9:21 |
| 7 | 25 | 2.0 | 12:18 | 6:23 |

*Taste evaluation after one week sample storage.

EXAMPLE 3

Experiments delineating the upper concentration limits of typical emulsion disruptors are detailed in this Example. Three representative disruptors were evaluated for their maximum permissible use level in a 45% fat content diet spread. The base spread is outlined below.

TABLE III

45% Fat Content Spread

| Ingredients | Weight % |
|---|---|
| Partially hydrogenated soybean oil (98.6) | 44.5 |
| Cottonseed Oil (1.4%) | |
| Distilled monoglycerides | 0.3 |
| Lecithin | 0.2 |
| Color/Vitamins | 0.01 |
| Butter Flavor | 0.009 |
| Water | 52.9 |
| Salt | 2.0 |
| Potassium Sorbate | 0.1 |
| Lactic Acid | 0.02 |
| EDTA | 0.0075 |
| Emulsion disruptor | — |

TABLE IV

Upper Use Limit of Various Emulsion Disruptors in 45% Fat Diet Spread

| Emulsion Disruptor | HLB | Inversion Point |
|---|---|---|
| Sodium dodecyl sulfate | 9.0 | 800–850 |
| Ethoxylated glycerol laurate | 17.0 | 110–130 |
| Tween 80 | 15.0 | 263–282 |

Incremental amounts of each emulsion disruptor were blended into the base spread of Table III. The point of phase inversion defines the upper use limit. Inversion points were determined by conductivity measurement. The inversion point is identified where conductivity becomes greater than 1 micro mho. Table IV indicates that the upper use limit of anionic disruptors such as sodium dodecyl sulfate is about 800 ppm. Emulsions appear to be considerably less tolerant of nonionic disruptors. Tween 80 caused inversion at 263–282 ppm. Emulsion breakage during Votator TM processing occurs at even lower Tween 80 ® concentration. Accordingly, Tween 80 ® use should be held well below about 240 ppm, preferably below 100 ppm. Similarly, ethoxylated glycerol laurate is best employed below 100 ppm.

EXAMPLE 4

Milk proteins, for instance whey or caseinates, have long been used by the margarine industry to aid in salt release in margarines containing high fat content. Emulsion disruptors of the instant invention, such as Tween 80, can be used in products where the addition of even small amounts of milk protein will cause phase inversion.

To illustrate this superior performance, the 40% fat, soft product spread of Table I, was reformulated with 0.5% whey in the absence of Tween 80. A whey induced phase inversion occurred. However, the same formulation substituting Tween 80 at 25 ppm for whey protein provided a satisfactory stable spread with good taste.

EXAMPLE 5

This example illustrates the flavor enhancement imparted by sodium dodecyl sulfate (SDS). A 45% fat content spread per Table III was formulated incorporating 200 ppm of SDS. Samples of this product were taste evaluated against control sample 1 (Table II) by a seven member expert tasting panel. All participants declared the SDS containing spread to be substantially saltier than the control.

EXAMPLE 6

The following experiment compares the low fat soft-type spreads of the present invention with the stick-type spreads of the Moran U.S. Pat. No. 4,115,598. The experiments were fashioned to determine whether the emulsion disruptors and their concentrations as outlined by Moran would behave similar to the type of oils used to prepare soft spreads of the present invention.

Table V lists a set of four low fat spread formulations. Packs A and B were prepared with an oil of the present invention which comprised 98.6% of a partially hydrogenated soybean oil and 1.4% of cottonseed oil. Pack A was prepared according to the present invention as outlined in Example 1 except that it lacked an emulsion disruptor. Buttermilk was incorporated into Pack B as a phase destabilizing emulsifier as described by Moran.

A thirty member taste panel was used to evaluate the relative tastes of Packs A and B. Each panelist was questioned as to which spread was saltier and which had better melting characteristics. Results of this test are recorded in Table VI. Pack B was found to be better melting and saltier by a large majority of the panelists. This confirms that the instability promoting emulsifiers described in Moran are effective in promoting melting and enhancing salt perception even when made with an oil of the present invention.

Packs C and D were made using a blend of 40% palm oil mid fraction and 60% sunflower oil. The blend was prepared to resemble as closely as possible the oil used in Example IV of Moran. Pack C was formulated similar to Pack A but 25 ppm Tween 80 ® was also included therein. Pack D had the equivalent composition as Pack C except that Tween 80 ® was omitted.

The same thirty member panel as used for Packs A and B evaluated Packs C and D. Table VI sets forth the results of the taste tests. Both Packs were found to be equal in apparent melting behavior and saltiness. This demonstrated that the use of 25 ppm Tween 80 ® was not effective when used in conjunction with a stick (hard) base stock as described by Moran in his Examples III and IV.

TABLE V

Low Fat Spread Comparative Formulations

| | Pack A | Pack B |
|---|---|---|

TABLE V-continued

Low Fat Spread Comparative Formulations

| | Weight % | Weight % |
|---|---|---|
| Base Stock*: | 44.5 | 38.0 |
| Partially hardened soybean oil (98.6%) | | |
| Cottonseed oil (1.4%) | | |
| Distilled monoglycerides | 0.3 | — |
| Lard monoglycerides | — | 0.5 |
| Lecithin | 0.2 | — |
| Color | 0.033 | 0.033 |
| Flavor | 0.009 | 0.009 |
| Water | 53.87 | 56.75 |
| Salt | 1.0 | 1.0 |
| Potassium sorbate | 0.1 | 0.1 |
| EDTA | 0.0075 | 0.0075 |
| Lactic acid | 0.020 | — |
| Tartaric acid | — | to pH 4.8 |
| Locust bean gum | — | 0.75 |
| Buttermilk | — | 3.0 |

*Solids content (SFI's) were at 10° C. (50° F.) = 12.0, 21.1° C. (70° F.) = 7.0 and 33.3° C. (92° F.) = 2.0.

| | Pack C Weight % | Pack D Weight % |
|---|---|---|
| Basetock*: | 44.458 | 44.458 |
| 40% palm oil mid fraction | | |
| 60% liquid sunflower oil | | |
| Distilled monoglycerides | 0.3 | 0.3 |
| Lecithin | 0.2 | 0.2 |
| Color | 0.033 | 0.033 |
| Flavor | 0.0009 | 0.0009 |
| Water | 52.8725 | 52.8725 |
| Salt | 2.0 | 2.0 |
| Potassium sorbate | 0.1 | 0.1 |
| Lactic acid | 0.02 | 0.02 |
| EDTA | 0.0075 | 0.0075 |
| Tween 80 ® | 0.0025 | 0 |

*Solids content (SFI's) were at 10° C. (50° F.) = 27.0, 21.1° C. (70° F.) = 9.5 and 33.3° C. (92° F.) = 0.6.

TABLE VI

PANEL TEST RESULTS

| | Saltier | Better Melt |
|---|---|---|
| Pack A | 3 | 5 |
| Pack B | 25 | 24 |
| No Difference | 2 | 1 |
| Pack C | 15 | 14 |
| Pack D | 12 | 14 |
| No Difference | 3 | 2 |

The foregoing description and examples illustrate selected embodiments of the present invention and in light thereof various modifications will be suggested to one skilled in the art, all of which are within the spirit and purview of this invention.

What is claimed is:

1. An edible water-in-oil emulsion, solid at refrigerator temperatures, comprising:
   (i) from about 30 to 80% oil as the continuous phase, wherein said oil has:
      (a) a solids content of 14 maximum at 10° C.,
      (b) a solids content of 6.0 to 8.5 at 21.1° C., and
      (c) a solids content of 0.7 to 2.8 at 33.3° C.;
   (ii) from about 70 to 20% water as the dispersed phase; and
   (iii) from about 10 to 75 parts per million, by weight of the total emulsion, of a nonionic emulsion disruptor with an HLB from 9 to 20.

2. An emulsion according to claim 1 wherein the nonionic emulsion disruptor is present from about 25 to 75 parts per million by weight of the total composition.

3. An emulsion according to claim 1 wherein the emulsion disruptor is a polyoxyethyated sorbitan mono-, di-, or tri-fatty acid ester.

4. An emulsion according to claim 3 wherein the emulsion disruptor is Polyoxyethylene 20 Sorbitan Monooleate.

5. An emulsion according to claim 1 wherein the emulsion disruptor is a polyoxyethylated derivative of compounds selected from the group consisting of fatty alcohol, fatty acid, glycerol, di-fatty glyceride and mono-fatty glyceride.

6. An emulsion according to claim 1 wherein the oil is present from about 35 to 60% by weight of the total emulsion.

7. An emulsion according to claim 1 wherein the oil comprises a partially hydrogenated vegetable oil.

8. An emulsion according to claim 6 wherein the partially hydrogenated vegetable oil is derived from soybean, corn, cottonseed, palm or palm kernel oil.

9. An edible water-in-oil emulsion, solid at refrigerator temperatures, comprising:
   (i) from about 30 to 80% oil as the continuous phase, wherein said oil has:
      (a) a solids content of 14 maximum at 10° C.,
      (b) a solids content of 6.0 to 8.5 at 21.1° C., and
      (c) a solids content of 0.7 to 2.8 at 33.3° C.;
   (ii) from about 70 to 20% water as the dispersed phase; and
   (iii) from about 10 to 900 parts per million, by weight of the total emulsion, of an anionic emulsion disruptor with an HLB from 9 to 20.

10. An emulsion according to claim 9 wherein the anionic emulsion disruptor is present from about 10 to 600 parts per million by weight of the total composition.

11. An emulsion according to claim 9 wherein the emulsion disruptor is sodium lauryl sulfate.

12. A method for preparing an edible water-in-oil emulsion with a reduced salt content, solid at refrigerator temperatures, which is not adversely affected in flavor comprising combining from about 10 to 75 parts per million, by weight of the emulsion, of a nonionic emulsion disruptor having an HLB from 9 to 20 with an emulsion containing:
   (i) from about 30 up to 80% oil as the dispersed phase, wherein said oil has:
      (a) a solids content of 14 maximum at 10° C.,
      (b) a solids content of 6.0 to 8.5 at 21.1° C., and
      (c) a solids content of 0.7 to 2.8 at 33.3° C.; and
   (ii) from about 70 to 20% water as the continuous phase.

13. A method according to claim 12 wherein the nonionic emulsion disruptor is present from about 25 to 75 parts per million by weight of the total composition.

14. A method according to claim 12 wherein the emulsion disruptor is a polyoxyethylated sorbitan mono-, di-, or tri-fatty acid ester.

15. A method according to claim 14 wherein the emulsion disruptor is Polyoxyethylene 20 Sorbitan Monooleate.

16. A method according to claim 12 wherein the emulsion disruptor is a polyoxyethylated derivative of compounds selected from the group consisting of fatty alcohol, fatty acid, glycerol, di-fatty glyceride and mono-fatty glyceride.

17. A method according to claim 12 wherein the oil is present from about 35 to 60% by weight of the total emulsion.

18. A method according to claim 12 wherein the oil comprises a partially hydrogenated vegetable oil.

19. A method according to claim 18 wherein the partially hydrogenated vegetable oil is derived from soybean, corn, cottonseed, palm or palm kernel oil.

20. A method for preparing an edible water-in-oil emulsion with a reduced salt content, solid at refrigerator temperatures, which is not adversely affected in flavor comprising combining from about 10 to 900 parts per million, by weight of the emulsion, of an anionic emulsion disruptor having an HLB from 9 to 20 with an emulsion containing:

(i) from about 30 up to 80% oil as the dispersed phase, wherein said oil has:

(a) a solids content of 14 maximum at 10° C., (b) a solids content of 6.0 to 8.5 at 21.1° C., and (c) a solids content of 0.7 to 2.8 at 33.3° C.; and (ii) from about 70 to 20% water as the continuous phase.

21. An emulsion according to claim 20 wherein the anionic emulsion disruptor is present from about 10 to 600 parts per million by weight of the total composition.

22. A method according to claim 20 wherein the emulsion disruptor is sodium lauryl sulfate.

23. A process for preparing an edible water-in-oil emulsion, solid at refrigerator temperatures, comprising:

(a) combining (i) from about 30 up to 80% oil as a dispersed phase, wherein said oil has:

(1) a solids content of 14 maximum at 10° C., (2) a solids content of 6.0 to 8.5 at 21.1° C., and (3) a solids content of 0.7 to 2.8 at 33.3° C.; with (ii) from about 70 to 20% water as the continuous phase to form an emulsion; and (b) adding to the formed emulsion from about 10 to 900 ppm of an emulsion disruptor having an HLB value from 9 to 20.

24. A product prepared by the process of claim 23.

* * * * *